(No Model.)

A. ECK.
SAFETY DEVICE FOR ELEVATORS.

No. 498,161. Patented May 23, 1893.

Witnesses

Inventor
August Eck,
By
Attorney

THE NORRIS PETERS CO., PHOTO-LITHO., WASHINGTON, D. C.

UNITED STATES PATENT OFFICE.

AUGUST ECK, OF HELENA, MONTANA.

SAFETY DEVICE FOR ELEVATORS.

SPECIFICATION forming part of Letters Patent No. 498,161, dated May 23, 1893.

Application filed September 22, 1892. Serial No. 446,603. (No model.)

*To all whom it may concern:*

Be it known that I, AUGUST ECK, of Helena, in the county of Lewis and Clarke and State of Montana, have invented certain new and useful Improvements in Safety Devices for Elevators; and I do hereby declare the following to be a full, clear, and exact description of the invention, such as will enable others skilled in the art to which it appertains to make and use the same.

This invention contemplates certain new and highly useful improvements in safety devices for mining cars or cages, elevators and the like, and it has for its object the production of cheap, simple and highly efficient mechanism for automatically checking and holding an elevator car or cage in the too rapid descent thereof.

The invention comprises two corresponding friction clamps between which a safety rope is passed, said rope being connected to the elevator car or cage, and a governor operated by said safety rope and connected with said friction clamps, whereby in the too rapid transit of said car or cage said friction clamps will be made to bind against and hold said safety rope.

The invention further comprises the detail construction, combination and arrangement of parts, substantially as hereinafter fully set forth and particularly pointed out in the claims.

Figure 1:
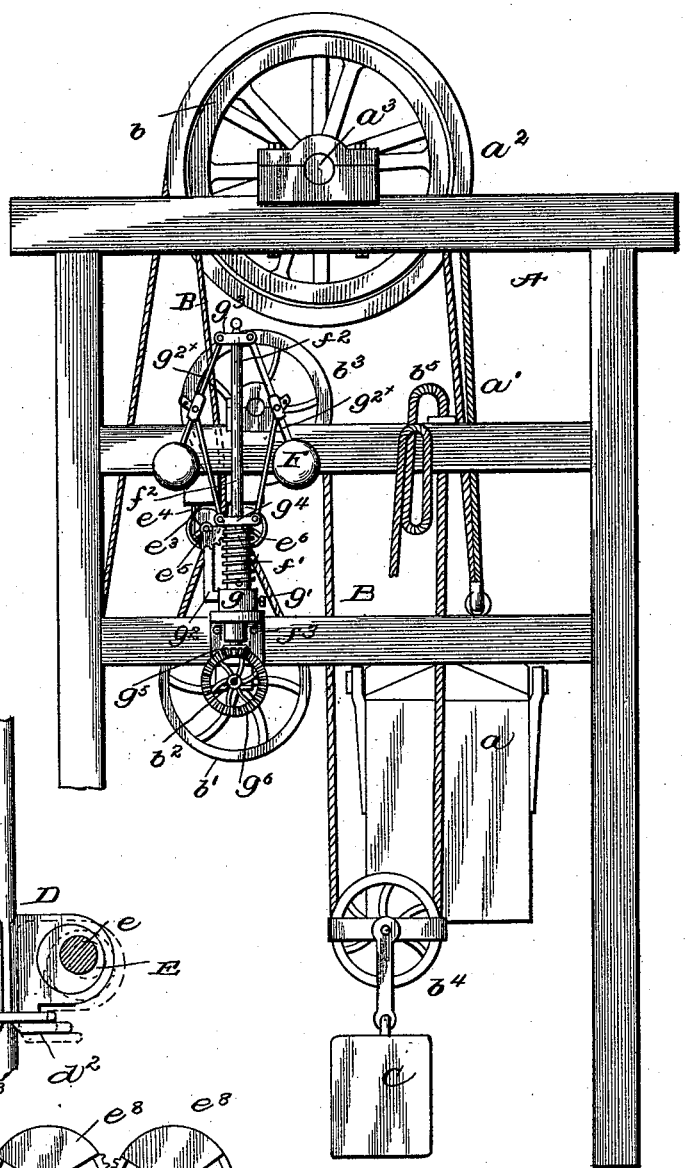
Figure 2:
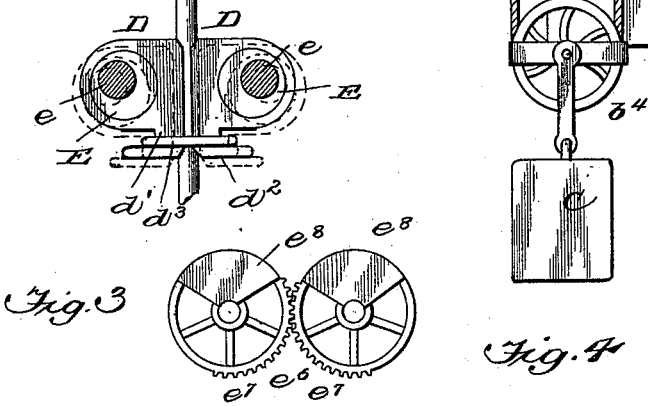
Figure 3:
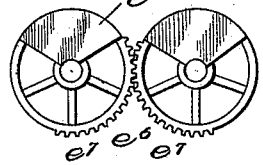
Figure 4:
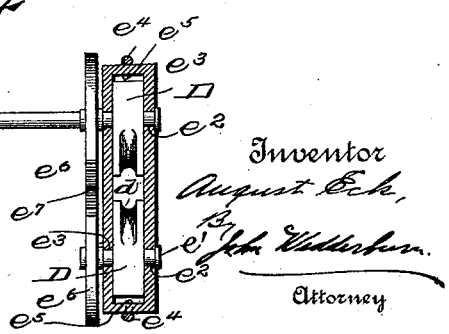

In the accompanying drawings:—Figure 1 is a view in side elevation showing a portion of an elevator frame-work provided with my improved safety device. Fig. 2 is a detail view showing the friction clamps binding the rope, their normal position being indicated by dotted lines. Fig. 3 is a view of the wheels of the clamps. Fig. 4 is a perspective view of the frame or holder for the clutch mechanism.

Referring to the drawings, A designates the frame-work of an elevator shaft; $a$ the car or cage, and $a'$ the hoisting rope leading from an engine (not shown) said rope being passed over a main pulley $a^2$ fast upon a shaft $a^3$ mounted on top of frame-work A. Upon this shaft is a loose pulley $b$.

B is a safety rope connected at one end to car or cage $a$ and passed up over loose pulley $b$ and thence down and around a pulley $b'$, whose shaft $b^2$ is journaled to frame-work A, and said rope is then passed diagonally upward and around a pulley $b^3$, whose shaft is likewise supported, and said rope is then carried downward and passed beneath a pulley $b^4$ of a counterpoise weight C, and is rigidly fastened at or near its other end, as at $b^5$, to frame-work A.

D, D, designate two corresponding friction clamps having each an inner vertical groove or recess $d$, a lower circular neck $d'$ and a flange or collar $d^2$. A ring $d^3$ encircles neck $d'$ and serves to hold the clamps as against too great separation.

The safety rope B is passed through the corresponding grooves or recesses $d$ of the clamps before being passed around pulley $b'$. Within circular openings in these clamps are located cams E, in eccentrically arranged openings in which are fitted shafts $e, e'$. These shafts are supported by being projected through coincident holes $e^2$ in an oblong box or casing $e^3$, which is held to frame-work A, by nutted rods $e^4$ having lower hooked ends $e^5$. Upon these shafts $e, e'$ are keyed two corresponding wheels $e^6$, having intermeshing segmental toothed surfaces $e^7$ and weighted portions $e^8$, which latter serve to maintain the wheels geared together and to normally keep the friction clamps out of binding engagement with the safety rope. The shaft $e$ is extended outwardly some distance, and upon it is fitted a toothed cam-wheel $f$, the teeth of which engage a threaded sleeve $f'$ of a governor F. The vertical shaft $f^2$ of this governor is supported near its lower end by a plate or bracket $f^3$ attached to framework A and upon said shaft is the sleeve $f'$. Beneath the latter is a collar $g$ held to bushing (not shown) by a set screw $g'$ and resting on said plate. Said collar is provided with an arm $g^2$ having an opening in its upper end through which shaft $e$ is passed, and thus said arm forms an outer support for said shaft. The collar $g$ and its arm can be adjusted horizontally to cause the clamp to fit the position of the safety rope. The weighted governor arms $g^2$ are pivotally connected to collars $g^3, g^4$, on shaft $f^2$, the collar $g^4$ being secured to sleeve $f'$. To the lower end of this shaft is keyed a bevel pinion $g^5$ which intermeshes with a bevel gear-wheel $g^6$ on shaft $b^2$ of pulley $b'$. The revolution of this latter pulley will effect the turning of the governor shaft, and the greater the revolution of said pulley the faster the governor will revolve. In the event of a too rapid descent of the car or cage the revolution of the governor is such that the elevation of the threaded sleeve $f'$ will effect the turning of wheels $e^6$ through the agency of shaft $e$ and its toothed cam, and the friction clamps will be made to firmly bind upon and hold the safety rope and thus check all further descent of the car or cage, which latter will be firmly held until the hoisting rope is acted upon by the engine so as to raise the car or cage and thus release the friction clamps, permitting them and the governor to return to their respective normal positions.

The advantages of my invention are apparent, and it will be specially observed that the mechanism employed is extremely simple and inexpensive and not liable to readily get out of order, and is always positive in its action, safe and reliable.

I claim as my invention—

1. The combination with an elevator car or cage and the hoisting rope secured thereto, of a safety rope also connected to said car or cage, corresponding friction clamps between which said safety rope is passed, the cams fitted in said clamps and designed to operate in conjunction with each other, and a governor operated by said safety rope and designed to operate said cams, substantially as set forth.

2. The combination with an elevator car or cage and the hoisting rope secured thereto, of the safety rope also connected to said car or cage, the corresponding friction clamps, the cams, the shafts therefor having intermeshing gear-wheels, one of said shafts also having a toothed cam, and the governor provided with a threaded sleeve with which said toothed cam engages, substantially as set forth.

3. The combination, with an elevator car or cage and the hoisting rope secured thereto, of the safety rope also connected to said car or cage, the corresponding friction clamps having inner grooves, the ring holding said clamps, the cams fitting in openings in said clamps, the box or holder, the shafts for said cams supported by said box or holder, one of said shafts having a toothed cam fitted thereon, the wheels on said shafts having segmental toothed portions and upper weighted portions, and the governor having a threaded sleeve with which said toothed cam engages, substantially as set forth.

4. The combination with an elevator frame and a car or cage having a hoisting rope, and the main pulley therefor, of the safety rope connected at one end to said car or cage and at its other end to said frame, the upper loose pulley, the two pulleys around which said safety rope is passed, the counterpoise weight having a pulley suspended from said safety rope, the friction clamps having intermeshing toothed wheels, the shaft of one of said latter wheels being provided with a cam, and the governor comprising a vertical shaft operated by one of said pulleys around which said safety-rope is passed, and the sleeve in said shaft for operating said cam, substantially as set forth.

5. The combination with an elevator car or cage and the hoisting rope secured thereto, of the safety rope also connected to said car or cage, the corresponding friction clamps, the cams, the shafts therefor having intermeshing gear-wheels, one of said shafts also having a tooth cam, the governor provided with a threaded sleeve with which said toothed cam engages, and the other adjustable arm supporting said latter shaft adjacent to said toothed cam, substantially as set forth.

In testimony whereof I have signed this specification in the presence of two subscribing witnesses.

AUGUST ECK.

Witnesses:
JOHN MCCAFFREY,
T. J. WALSH.